United States Patent [19]

Pelletier

[11] 4,170,279

[45] Oct. 9, 1979

[54] FLUID FLOW CONTROL DEVICES

[75] Inventor: Claude Pelletier, Saint Vallier, France

[73] Assignee: Societe Anonyme Potain Pioclain Materiel (P.P.M.), France

[21] Appl. No.: 787,220

[22] Filed: Apr. 13, 1977

[30] Foreign Application Priority Data

Apr. 30, 1976 [FR] France .................... 76 13021

[51] Int. Cl.² ............... B60G 25/00; F16F 9/32; G05D 11/00

[52] U.S. Cl. .................... 188/300; 91/437; 137/118; 137/596.15; 267/11 A; 267/65 D; 280/709; 280/714

[58] Field of Search ............ 91/416, 437, 436, 420, 91/464, 457; 280/709, 714; 267/11 A, 65 D; 188/300; 137/885, 869, 596.15, 118

[56] References Cited

U.S. PATENT DOCUMENTS

| | | | |
|---|---|---|---|
| 3,026,103 | 3/1962 | Gates | 280/714 X |
| 3,274,902 | 9/1966 | Kleckner | 91/420 |
| 3,381,587 | 5/1968 | Parquet | 91/420 |
| 3,795,178 | 3/1974 | Roche | 91/420 |
| 3,908,515 | 9/1975 | Johnson | 91/437 X |
| 4,034,815 | 7/1977 | Delelan | 91/437 X |

FOREIGN PATENT DOCUMENTS

699292  12/1964  Canada .................... 280/709

*Primary Examiner*—Irwin C. Cohen
*Attorney, Agent, or Firm*—Fitzpatrick, Cella, Harper & Scinto

[57] ABSTRACT

A fluid flow control device suitable for controlling the flow of fluid between two chambers of a jack comprises a valve between each of the two chambers being controlled and a common chamber. The valves are controlled by pilot operated stops which, when retracted permit the valves to close fully but which, when extended hold the valves partially open. A source of make-up fluid can be connected to the common chamber, and the feed to the pilot valves can be tapped off the common chamber by way of a restriction. Alternatively, the pilot valves can be isolated from the common chamber and a separate source of pilot fluid provided. In this case, the common chamber can be permanently connected to a source of fluid under pressure which can be a fluid pressure accumulator.

4 Claims, 6 Drawing Figures

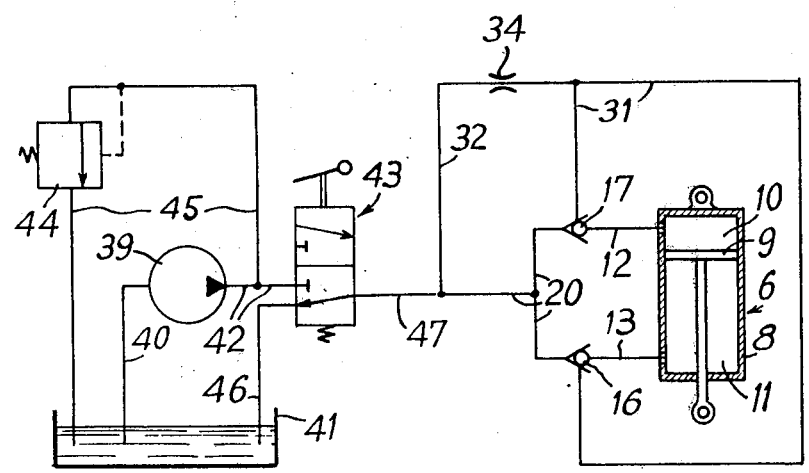
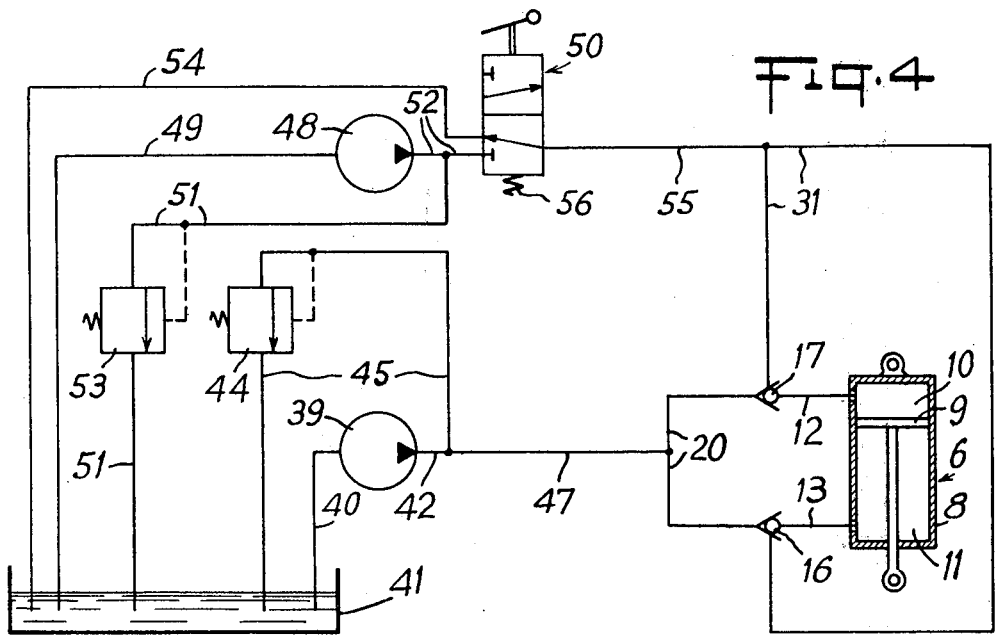

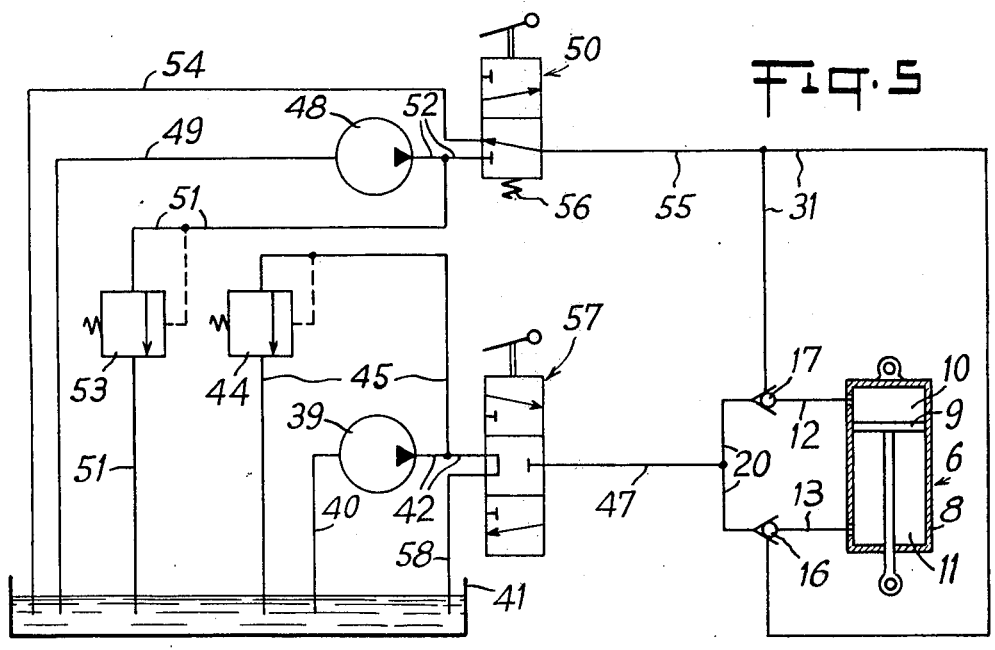
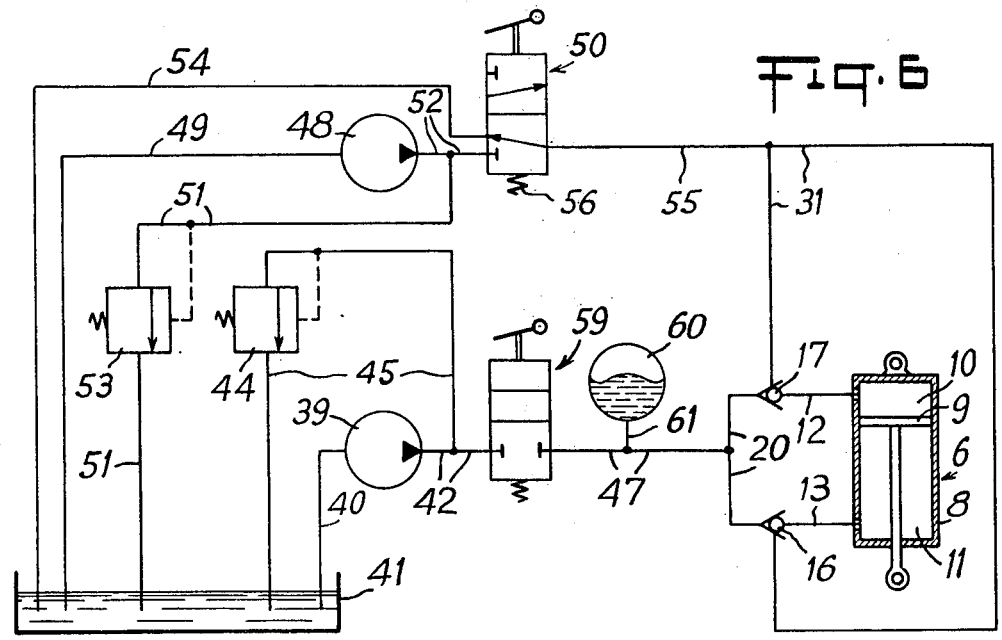

FLUID FLOW CONTROL DEVICES

This invention relates to fluid flow control devices, and to a vehicle suspension incorporating a fluid flow control device.

The suspensions system of a civil engineering machine (e.g. a crane or a hydraulically operated shovel) may comprise a plurality of hydraulic jacks the chambers of which can be put selectively into communication or isolated from each other, depending upon whether it is desired to obtain normal operation of the suspension or on the contrary locking of the suspension.

Known control devices do not in a simple manner enable distinct flows to be obtained, depending upon whether the fluid is, being admitted into or on the contrary, delivered out of an enclosure. Nor do they enable simple and stable control of unblocking.

According to the present invention there is provided a fluid flow control device comprising: first and second movable valves arranged in respective first and second pipes, each movable valve being capable of being arranged in a first extreme position of complete closure, a second extreme position of complete opening, and a position intermediate between these two extreme positions, with which corresponds an opening less than the said complete opening; resilient return means biasing each valve into said first extreme position; and a movable stop adjacent each said valve, each stop being coupled to a pilot jack and to a resilient return-member and being capable of being arranged in a first position in which the pilot jack is not supplied with pilot fluid and the stop is out of reach of its respective valve, and a second position in which the pilot jack is connected to a source of pilot fluid and the stop is positioned to keep its respective valve open, at least in its intermediate position.

Also according to the invention there is provided a vehicle suspension comprising at least one suspension jack having first and second chambers; first and second pipes connected respectively to the first and second chambers, and a device for controlling the flow of fluid between the chambers, the device comprising first and second movable valves arranged respectively in the first and second pipes, each movable valve being capable of being arranged in a first extreme position of complete closure, a second extreme position of complete opening, and a position intermediate between these two extreme positions, with which corresponds an opening less than the said complete opening; resilient return means biasing each valve into said first extreme position; and a movable stop adjacent each said valve, each stop being coupled to a pilot jack and to a resilient return-member and being capable of being arranged in a first position in which the pilot jack is not supplied with pilot fluid and the stop is out of reach of its respective valve, and a second position in which the pilot jack is connected to a source of pilot fluid and the stop is positioned to keep its respective valve open at least in its intermediate position.

The invention will be better understood from the following description of preferred embodiments thereof, given by way of example only, reference being had to the accompanying drawings, wherein:

FIGS. 3 to 6 illustrate diagrammatically four circuits employing in four ways embodiments of the control device in accordance with the invention.

Figure 1:
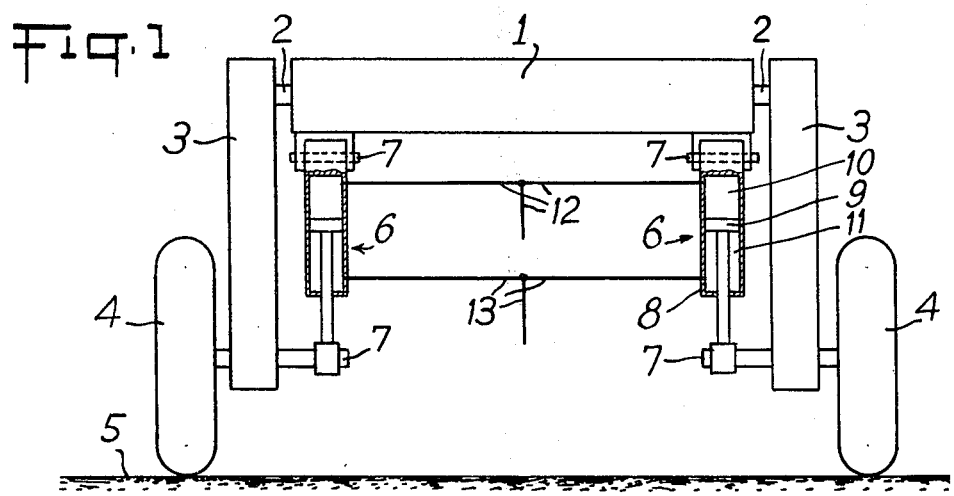
FIG. 1 shows an embodiment of a suspension system in accordance with the invention for two wheels of a mobile crane.

FIG. 1 shows the chassis 1 of a crane onto which arms 3 are hinged about horizontal pins 2. The arms 3 support wheels 4 which bear against the ground 5. A jack 6 is coupled between each arm 3 and the chassis 1 by means of hingepins 7. Each jack includes a cylinder 8 inside which a piston 9 defines two chambers, a large chamber 10 of effective area equal to the cross sectional area of the cylinder, and a small chamber 11, of effective area equal to the effective area of the large chamber 10 less the cross sectional area of the piston rod. The two large chambers 10 are connected by a pipe 12 and the two small chambers 11 are connected by a pipe 13.

Figure 2:
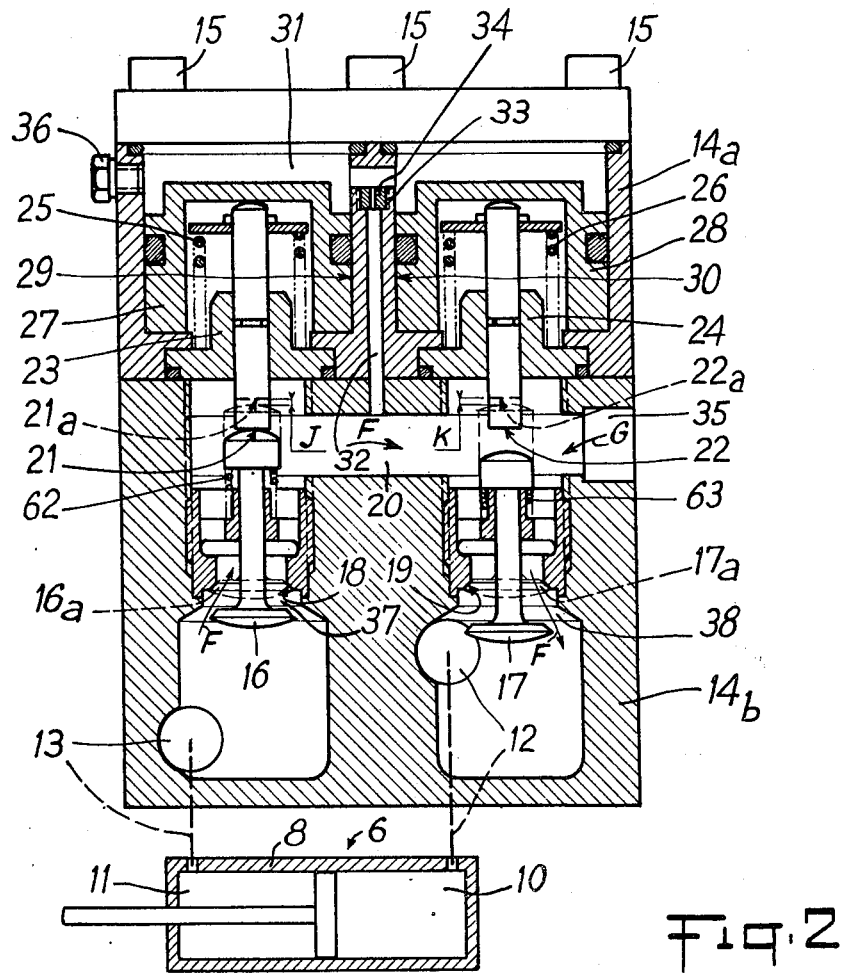
FIG. 2 is a section view through an embodiment of a control device in accordance with the invention, employed in the suspension system of FIG. 1.

The pipes 12, 13 are connected to the control device shown in FIG. 2. This device comprises a valve body having two portions 14a, 14b which assembled by screws 15, and two movable valves 16, 17 capable of engaging respective seats 18, 19 (as shown in dotted lines at 16a, 17a) and separating a cramming chamber 20 from the pipes 13 and 12 respectively.

Two movable stops 21, 22 which are mounted to slide in guides 23, 24 fixed in the portion 14a of the valve body are arranged facing the valves 16, 17, respectively, and are acted on by springs 25, 26 tending to bias the stops to the position shown in dotted lines at 21a and 22a out of reach of the valves 16, 17.

Two pistons 27, 28 sliding in bores 29, 30 in the portion 14a are respectively arranged so as to bear against the end of each stop 21, 22 remote from the valves.

A pilot chamber 31 common to the two pistons is provided for admitting fluid to the pistons. A duct 32 connects the chambers 20 and 31 and is equipped with a threaded recess 33 into which is screwed in the device illustrated, a constriction nozzle 34. The chamber 20 has a connection 35 which, in use, is connected to a source of cramming fluid and the chamber 31 has a connection 36 which can, in use, be connected to a source of piloting fluid.

It is to be observed that in the positions 16a, 17a of the valves and 21a, 22a of the movable stops the latter are not in contact with the said valves, clearances J and K separating them from these valves. Also, when a valve is bearing against its corresponding stop (e.g. the valve 16 against the stop 21, as shown in FIG. 2) the passage 37 which is thereby formed between the valve and the seat has an area less than that of the passage 38 through a valve which is wide open (e.g. the valve 17 as shown in FIG. 2).

The diagram of FIG. 3 illustrates a circuit for feeding the chambers 10 and 11 of a jack 6. A pump 39 is connected by its suction pipe 40 to a tank 41 of fluid and by its delivery pipe 42 to a two-position distributor 43. A calibrated relief-valve 44 is arranged in a pipe 45 tapped off from the delivery pipe 42. In addition, a pipe 46 connects the distributor 43 to the tank 41, and a pipe 47 connects the chamber 20, shown diagrammatically by pipes, to the distributor. It will also be observed that the sources of cramming fluid and of pilot fluid are here the same and consist of the pump 39. The pilot chamber 31 too is shown diagrammatically by two pipes.

The first and second positions of the distributor 43 correspond respectively to putting the pipes 42 and 47 into communication and shutting off the pipe 46, and putting the pipes 46 and 47 into communication and shutting off the pipe 42.

The diagram of FIG. 4 includes many components already shown in FIG. 3. It will be observed, however, that the distributor 43 has been omitted, the pipes 47 and 4 being permanently connected. Furthermore, instead of the constriction nozzle 34 a plug for closing the duct 32 has been screwed into the recess 33.

The source of cramming fluid, comprising the pump 39, is this time distinct from the source of pilot fluid, which comprises another pump 48. The latter is connected to the tank 41 by its suction pipe 49 and to a two-position distributor 50 by its delivery pipe 52. A pipe 51 is tapped off the delivery pipe 52 and a calibrated relief-valve 53 is arranged in the pipe 51. A pipe 54 connects the distributor 50 to the tank 41, and a pipe 55 connects the chamber 31 to the distributor 50. The constriction 34 has been omitted because communication between the chambers 20 and 31 has itself been omitted.

The first and second positions of the distributor 50 correspond respectively to putting the pipes 52 and 55 into communication and shutting off the pipe 54, and putting the pipes 54 and 55 into communication and shutting off the pipe 52. A spring 56 tends to return the distributor 50 into its second position.

FIG. 5 shows a modification of the device of FIG. 4 in which the pipes 42 and 47 are no longer directly connected together but are both connected to a three-position distributor 57 which another pipe 58 connects to the tank 41.

The first, second and third positions of the distributor 57 correspond respectively to putting the pipes 42 and 47 into communication and shutting off the pipe 58; putting the pipes 42 and 58 into communication and shutting off the pipe 47; and putting the pipes 47 and 58 into communication and shutting off the pipe 42.

FIG. 6 shows a circuit similar to that of FIG. 5 but in which the distributor 57 is replaced by a two-position distributor 59 to which only the pipes 42 and 47 are connected. In addition a pressurised fluid accumulator 60 is connected to the pipe 47 by a pipe 61.

The operation of the devices which have been described will now be explained.

Referring firstly to FIGS. 2 and 3, when the distributor 43 is put in its second position (as shown in FIG. 3) the pressure is low in the chamber 20, in the pipe 32 and in the chanber 31, since the pipe 47 is in communication with the tank 41 by way of the distributor 43. The springs 25 and 26 push up the stops into retracted positions 21a, 22a, and along with the pistons 27, 28. Similarly, under the effect of return springs 62, 63 the valves of the control device are arranged in the position of complete closure 16a, 17a. Consequently the chambers 10 and 11 are isolated from one another and each is isolated from the delivery of the pump 39 so that the jack 6 is locked.

When this jack 6 forms part of a suspension such as that illustrated in FIG. 1, this suspension is in turn locked with excellent oiltightness obtained by the valves 16a, 17a.

If the distributor 43 is put in its first position, fluid under pressure is admitted to chamber 20 through the pipes 42 and 47 and to chamber 31 through duct 32 and constriction 34. The pressure in chamber 31 causes displacement of the pistons 27, 28 and the stops which are coupled to them to their down positions 21, 22. The valves 16, 17 are consequently piloted to be arranged at least partially open. Communication is established between the chambers 10 and 11 of the jack(s) 6 and the suspension of FIG. 1 is unlocked.

If the wheel 4 of a particular jack 6 is over a depression in the ground this wheel will have a tendency to move away from the chassis 1. The large chamber 10 fills with fluid, the small chamber 11 on the contrary emptying. The fluid passes from the one to the other of these chambers in the direction of the arrows F as shown in FIG. 2. But the volume of fluid delivered out of the chamber 11 is less than that which must be admitted into the chamber 10, so the contribution of a complementary volume is supplied by the pump 39 (arrow G).

It will be noted that taking into account the relatively limited area of the passage 37 through the valve 16, the fluid delivered out of the chamber 11 is braked, as would be that delivered out of the chamber 10 in a configuration in which the wheel 4 had to move nearer the frame 1. The suspension therefore has a damped operation. The load loss caused by the constriction 34 avoids the fluctuations in pressure in the chamber 20 being directly reflected in the chamber 31; the piloting may consequently be effected without disadvantage by means of the fluid from the pump 39 which is employed likewise for supplying complementary cramming fluid to the chamber 10.

In the embodiment of FIG. 4 cramming fluid permanently feeds the chamber 20. Control of the configuration of the suspension is carried out by acting solely upon the piloting of the valves 16, 17 which this time is entirely separate from the cramming circuit. This piloting is effected by the fluid delivered by the pump 48 and by adjustment of the position of the distributor 50 which depending upon whether it is put in its first or in its second position controls the opening of the valves 16, 17 or on the contrary leaves these valves closed.

The embodiment of FIG. 5 operates like that of FIG. 4, except that there exists in addition the possibility of bringing the cramming pressure to zero by putting the distributor 57 in its third position. In addition the second position of this distributor corresponds with locking of the suspension, which is an advantage when the chassis 1 is being moved over uneven ground, whilst working. Such a circuit is preferably used for the control of the suspension of the wheels supporting the greater portion of the load being moved by the machine.

In the circuit of FIG. 6, when the distributor 50 is in its first position and controls the opening of the valves 16, 17, compensation of the variations in the volumes of fluid admitted into one of the chambers 10, 11 and delivered from the other is effected by means of the accumulator 60. The suspension thus equipped then constitutes an oleo-pneumatic suspension.

The first and second positions of the distributor 59 respectively correspond to putting the pipes 42 and 47 into communication, and isolating the pipes 42 and 47 from each other. It is of course when the distributor 59 is put in its second position that the oleo-pneumatic suspension is achieved.

What is claimed is:

1. A fluid flow control device comprising first and second movable valves arranged in respective first and second pipes, each movable valve being capable of being arranged in a first extreme position of complete closure, a second extreme position of complete opening, and a position intermediate between these two extreme positions, with which corresponds an opening less than the said complete opening, resilient return means biasing each valve into said first extreme position, a common chamber, means connecting said first and second valves to said chamber, means for supplying said chamber with fluid under pressure, a pair of pilot jacks, means connecting each pilot jack to said chamber via a flow restriction orifice, a movable stop adjacent each said valve, each stop being coupled to one of said pilot jacks and to a resilient return-member and being capable of being arranged in a first position in which the pilot jacks are not supplied with pilot fluid from said chamber and the stop is out of reach of its respective valve, and a second position in which the pilot jacks are supplied with pilot fluid from said chamber and the stop is positioned to keep its respective valve open at least in its intermediate position.

2. Vehicle suspension applying the device of claim 1 characterized in that it comprises at least one main jack with two chambers and means connecting each such jack chamber with one of said pipes, while a distributor of at least two positions is disposed between said common chamber and said means for supplying fluid under pressure and in one position isolates the said chamber from the said source, establishing on the contrary in another position communication between said chamber and said means for supplying fluid under pressure.

3. A vehicle suspension comprising at least one suspension jack having first and second chambers; first and second pipes connected respectively to the first and second chambers, and a device for controlling the flow of fluid between the chambers, the device comprising: a common chamber, means connecting said common chamber to source of fluid under pressure, first and second movable valves arranged respectively in the first and second pipes, means connecting said first and second valves to said common chamber, each movable valve being capable of being arranged in a first extreme position of complete closure, a second extreme position of complete opening, and a position intermediate between these two extreme positions, with which corresponds an opening less than the said complete opening, resilient return means biasing each valve into said first extreme position; a pair of pilot jacks, means connecting each pilot jack to said chamber via a flow restriction orifice for supplying pilot fluid, and a movable stop adjacent each said valve, each stop being coupled to one of said pilot jacks and to a resilient return member and being capable of being arranged in a first position in which the pilot jack is not supplied with pilot fluid and the stop is out of reach of its respective valve, and a second position in which the pilot jack is supplied with pilot fluid and the stop is positioned to keep its respective valve open at least in its intermediate position.

4. A vehicle suspension according to claim 3 in which the source of fluid under pressure comprises a fluid pressure accumulator.

* * * * *